(12) United States Patent
Onoue (10) Patent No.: US 8,341,468 B2
(45) Date of Patent: Dec. 25, 2012

(54) INFORMATION APPARATUS

(75) Inventor: Kunihito Onoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 772 days.

(21) Appl. No.: 12/359,341

(22) Filed: Jan. 25, 2009

(65) Prior Publication Data

US 2009/0190454 A1 Jul. 30, 2009

(30) Foreign Application Priority Data

Jan. 25, 2008 (JP) ................................ 2008-014820

(51) Int. Cl.
*G11C 29/00* (2006.01)

(52) U.S. Cl. ....................................... 714/718; 711/114

(58) Field of Classification Search .................. 714/718; 711/114
See application file for complete search history.

(56) References Cited

U.S. PATENT DOCUMENTS

| | | | |
|---|---|---|---|
| 5,522,035 A | 5/1996 | Yamanishi | |
| 5,651,133 A * | 7/1997 | Burkes et al. ................. | 711/114 |
| 6,636,985 B1 * | 10/2003 | Ono et al. .................... | 714/6.13 |
| 2004/0230399 A1 | 11/2004 | Shin | |
| 2005/0015547 A1 | 1/2005 | Yokohata et al. | |
| 2007/0055704 A1 | 3/2007 | Watanabe et al. | |
| 2007/0250302 A1* | 10/2007 | Xu et al. ......................... | 703/20 |
| 2009/0083481 A1* | 3/2009 | Wang et al. ................... | 711/114 |

FOREIGN PATENT DOCUMENTS

| | | |
|---|---|---|
| JP | 06-309118 | 11/1994 |
| JP | 2001-5616 A | 1/2001 |
| JP | 2002-366308 | 12/2002 |
| JP | 2004-342116 | 12/2004 |
| JP | 2005-50303 A | 2/2005 |
| JP | 2007-072519 | 3/2007 |

OTHER PUBLICATIONS

Japanese Office Action mailed Sep. 25, 2012 for corresponding Japanese Application No. 2008-014820, with English-language translation.

* cited by examiner

*Primary Examiner* — Sam Rizk (74) *Attorney, Agent, or Firm* — Fujitsu Patent Center (57) ABSTRACT

A test unit is provided for executing a confirmation test on the storage area of the storage apparatus. A storage area management unit sets an accessible valid storage area in the storage area, and extends the accessible valid storage area to include a part of the storage area. The part of the storage area used to extend the accessible valid storage is confirmed for normal operation by the test unit.

20 Claims, 4 Drawing Sheets

| DEFINITION DATA TYPE | DEFINITION DATA |
|---|---|
| TOTAL CAPACITY | 1 TB |
| SET CAPACITY FOR SHIPMENT | 100 GB |
| CAPACITY EXTENSION UNIT | 100 GB |
| CHECK INTERVAL OF USED CAPACITY | 24 HOURS |
| WORKING FACTOR AT WHICH EXTENSION IS STARTED | 80% |
| TEST SPECIFICS | READ TEST |
| TEST EXECUTION METHOD | BACKGROUND EXECUTION |
| WORKING FACTOR FOR VALIDATION | 90% |

INFORMATION APPARATUS

CROSS-REFERENCE TO RELATED APPLICATION

This application is based upon and claims the benefit of priority of the prior Japanese Patent Application No. 2008-14820 filed on Jan. 25, 2008, the entire contents of which are incorporated herein by reference.

BACKGROUND

1. Field

Embodiments of the present invention relate to an information apparatus for managing the valid storage area of a storage apparatus associated with the information apparatus.

2. Description of Related Art

In recent years, storage apparatuses such as the HDD (Hard Disk Drive) and the RAID (Redundant Array of Independent Disks), for example, have increased in capacity. A distributed storage apparatus including a plurality of storage units is also available and thus, the storage capacity of storage apparatuses continues to increase (e.g. Japanese Laid-open Patent Publication No. 2005-50303, for example). A recording medium test for storage apparatuses is conducted on all the recording media, e.g., the total storage capacity (areas) of each storage apparatus.

However, the storage capacity of the storage apparatuses such as HDD and RAID, for example, has recently increased to such a degree that a very long time is required to test the entire storage area of storage apparatuses. This results in increased personnel expenditure and equipment cost, thereby leading to increased production cost of the storage apparatuses.

A read/write test, if conducted as a recording medium test for a storage apparatus having the storage capacity of 1 TB, for example, requires about 5 hours. Accordingly, in the shipment test of a product including a large-capacity HDD or RAID, for example, it may be impractical and/or difficult to conduct the recording medium test for all the storage areas thereof.

A conceivable solution to this problem is to test only a part of the products or a part of the entire storage area. To conduct a test only on a part of the products or the storage area, however, is not the most desirable choice, because malfunctions or defects may be missed that effect the quality of the product being shipped.

Even in the case where the product shipment test is conducted over a sufficiently long time to test the quality of the entire storage area, some part of the large-capacity storage area which is probably left unused over a long time is liable to develop a fault, such as a medium malfunction at the time of actual use, for example.

SUMMARY

An embodiment of the present invention is directed, at least in part, to addressing the above noted deficiencies of related techniques as noted above. For example, an example of an embodiment of the present invention provides an information apparatus and storage apparatus having a high capacity storage area that may be tested in a relatively short period of time as compared to the related techniques and device noted above.

An embodiment of the present invention provides an information apparatus accessing a storage apparatus. The information apparatus includes a test unit to execute a confirmation test on a storage area of the storage apparatus, and a storage area management unit. The storage management unit sets an accessible valid storage area in the storage area, and extends the accessible valid storage area to include a part of the storage area for which normal operation is confirmed by the test unit.

It is to be understood that both the foregoing summary description and the following detailed description are explanatory as to some embodiments of the present invention, and not restrictive of the present invention as claimed.

BRIEF DESCRIPTION OF THE DRAWINGS

Embodiments are illustrated by way of example and not limited by the following figures.

DESCRIPTION OF EXAMPLES OF EMBODIMENTS

It will be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present. Like reference numerals refer to like elements throughout.

Examples of Embodiments will be explained below with reference to the drawings.

Figure 1:
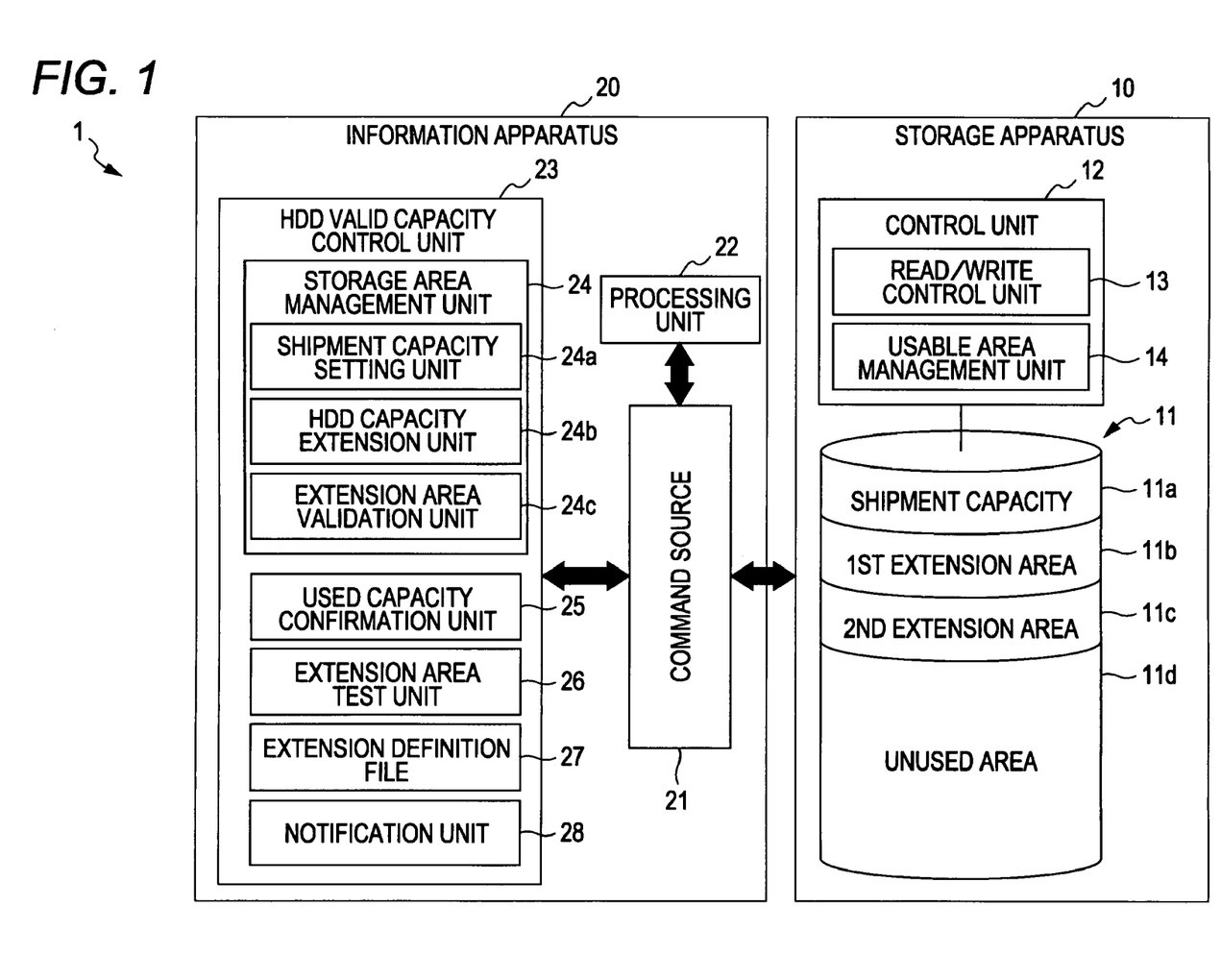
FIG. 1 is a block diagram depicting an information processing system according to an example of an embodiment of the present invention.

First, with reference to the block diagram of FIG. 1, the configuration of an information processing system 1 is explained. As shown in FIG. 1, the information processing system 1 includes a storage apparatus 10 and an information apparatus 20.

The storage apparatus 10 includes a disk unit 11 having a storage area for storing the data and a control unit 12 for controlling the disk unit 11. Incidentally, the control unit 12 may include, for example, the firmware of the storage apparatus 10. The disk unit has, for example, recording media (such as optical disks, not shown) and disk drives (not shown).

The control unit 12 controls the disk unit 11 and includes a read/write control unit 13 and a usable area management unit 14.

The read/write control unit 13 causes the disk drive of the disk unit 11 to read the data from the disk 11, e.g., execute a process of reading the data recorded in the disk unit 11 in accordance with the access from the external information apparatus 20, for example. Also, the read/write control unit 13, in accordance with the access from the information apparatus 20, causes the disk drive of the disk unit 11 to execute a process of writing to the disk unit 11, e.g., the process of writing the data into the storage area of the disk unit 11, for example. For example, the read/write control unit 13 executes the process in accordance with a command issued from a command source 21, described later, of the information apparatus 20.

The usable area management unit 14 manages an available storage area and a prohibited storage area on the disk unit 11. The usable area management unit 14 limits the available storage area, which is available for use, of the disk unit 11 to a part of the entire storage area of the particular disk unit 11. For example, the usable area management unit 14 limits the available storage area in accordance with a SET_MAX_AD-DRESS command if the storage apparatus 10 is the ATA (AT Attachment) HDD and in accordance with a MODE_SE-LECT command if the storage apparatus 10 is the SCSI (Small Computer System Interface) HDD. For example, the usable area management unit 14 may limit the HDD capacity available for use (hereinafter sometimes referred to as the valid capacity) to a capacity smaller than the original capacity. Further, the usable area management unit 14 may prohibit the use of the storage area at a specified address (block) of the disk unit 11. This operation of the usable area management unit 14 will be explained in detail with the description of an extension area test unit 26, described later, of the information apparatus 20.

Still referring to FIG. 1, the information apparatus 20 provides access to the storage apparatus 10 and includes a command source 21, a processing unit 22 and a HDD valid capacity control unit 23.

Figure 2:
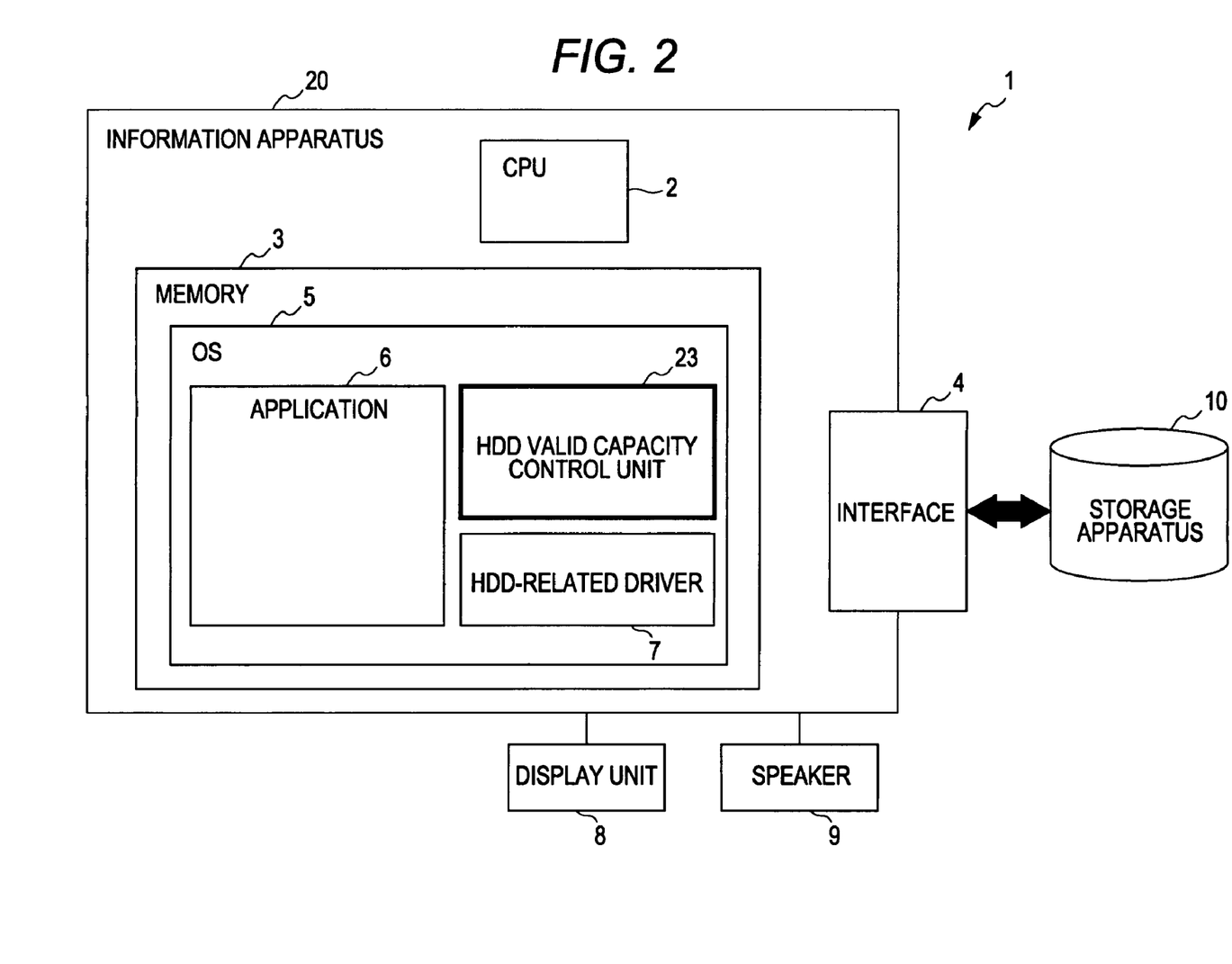
FIG. 2 is a diagram for explaining a hardware configuration of an information processing system according to an example of an embodiment of the present invention.

The information apparatus 20, as shown in FIG. 2, for example, includes a CPU (central processing unit) 2, a memory 3 and an interface 4. Incidentally, the information apparatus 20 is connected also with, for example, a display unit (monitor) 8 and a speaker 9.

The interface 4 is for connecting with the storage apparatus 10. For example, the interface 4 may be one of the PATA (Parallel Advanced Technology Attachment), SATA (Serial Advanced Technology Attachment), SCSI (Small Computer System Interface), SAS (Serial Attached SCSI), ISCSI (Internet Small Computer System Interface), FC (Fiber Channel) and SB (Universal Serial Bus).

The HDD valid capacity control unit 23 may be realized by a portion of an OS (operating system) 5 implemented in the memory 3. The HDD valid capacity control unit 23 may be developed, for example, on the OS 5 by executing a storage area management program described later, which is stored on a computer readable recording medium. Incidentally, other applications 6 may be realized by the OS 5. Also, operations of the command source 21 may be realized by a part of the HDD-related driver 7 of the OS 5. Further, the processing unit 22 may be realized by the application 6 on the OS 5 or the CPU 2, for example.

The command source 21 of the information apparatus 20 issues a processing command (for example, a read/write command) to the storage apparatus 10 to access the storage apparatus 10. For example, the information apparatus 20 may execute a read process or a write process for the storage area of the disk unit 11 included in the storage apparatus 10, thereby providing access to the storage apparatus 10. The command source 21 issues various commands to the storage apparatus 10 in response to the instruction from the processing unit 22 and the HDD valid capacity control unit 23.

The processing unit 22 is for providing access to the storage apparatus 10. This access may be provided by causing the command source 21 to issue the read/write command.

Incidentally, in accordance with the instruction from the HDD valid capacity control unit 23, a valid capacity control command such as the SET_MAX_ADDRESS command or the MODE_SELECT command described above, for example may be issued by the command source 21 to the usable area management unit 14 of the control unit 12 of the storage apparatus 10. The valid capacity control command such as the SET_MAX_ADDRESS command or the MODE_ SELECT command may limit or extend the valid storage area accessible by the processing unit 22.

The HDD valid capacity control unit 23 controls the capacity of the accessible valid storage area (hereinafter referred to also as the valid capacity) of the entire storage area included in the disk unit 11 of the storage apparatus 10. As depicted in FIG. 1, the HDD valid capacity control unit 23 includes a storage area management unit 24, a used capacity confirmation unit (usage monitor unit) 25, an extension area test unit (operation confirmation test unit) 26, an extension definition file 27 and a notification unit 28.

The storage area management unit 24 limits the valid storage area of the disk unit 11 of the storage apparatus 10 to a part of the entire storage area of the disk unit 11, and extends the limited valid storage area. The limiting or extending may be performed in a stepwise manner. The storage area management unit 24 includes a shipment capacity setting unit 24a, a HDD capacity extension unit 24b and an extension area validation unit 24c.

The shipment capacity setting unit 24a sets the valid capacity at the time of shipment, which may be referred to as an initial valid capacity. For example, the shipment capacity setting unit 24a limits the initial valid capacity by issuing a valid capacity control command from the command source 21 to the storage apparatus 10. The degree to which the valid capacity is set by the shipment capacity setting unit 24a. The degree to which the valid capacity is set may be preset in the extension definition file 27, for example.

Figure 3:
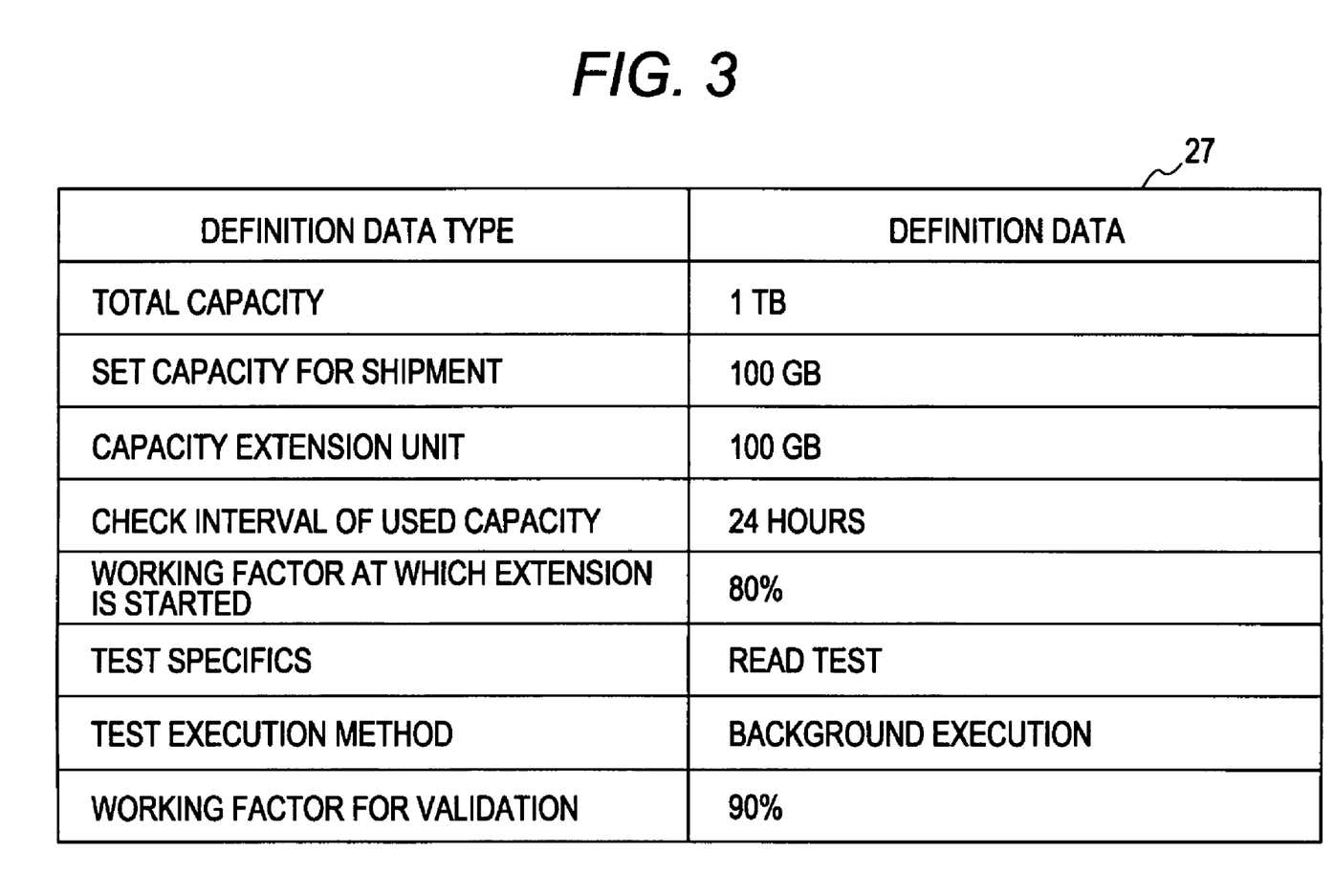
FIG. 3 depicts an example of a extension definition file of a HDD valid capacity control unit of the information apparatus of the information processing system according to an example of an embodiment of the present invention.

Now, the extension definition file 27 depicted in FIG. 3 is explained. The extension definition file 27 holds various setting values, or in this case, definition data.

For example, the extension definition file 27 includes definition data types. Examples of the definition data types depicted in FIG. 3 include a total capacity of the disk unit 11, a set capacity for shipment, a capacity unit for extension, intervals at which the used capacity is checked, a working factor at which the extension is started, test specifics, a test execution method and a usage ratio for executing the validation of the storage apparatus 10. An example of specific definition data held as the definition data types noted above are depicted in FIG. 3 as 1 TB, 100 GB, 100 GB, 24 hours, 80%, read test, background execution and 90%, respectively.

In order that the set capacity 100 GB for shipment held in the extension definition file 27 may be set as a valid capacity, the shipment capacity setting unit 24a causes the command source 21 to transmit the valid capacity control command to the storage apparatus 10 to achieve the valid capacity of 100 GB.

Incidentally, the usable area management unit 14 of the control unit 12 of the storage apparatus 10, upon receipt of the valid capacity control command from the command source 21, manages the storage area of 100 GB as a usable area, i.e. a valid storage area. For example, the valid capacity control command designates not a specific valid usable area but only the valid capacity thereof. A particular area of the disk unit 11, which constitutes a valid usable area, may be determined by the usable area management unit 14, for example. The usable area management unit 14 sets and manages, as the valid storage area, the storage area for which the operation confirmation test is conducted to confirm normal operation thereof before the shipment of the storage apparatus 10.

For example, by the time of shipment, the shipment test has been conducted on the storage area of the storage apparatus 10 corresponding to at least the set capacity of the extension definition file 27 for shipment, and the usable area management unit 14 of the control unit 21 has stored therein a particular area already tested. Then, the usable area management unit 14 sets, as the valid storage area, the storage area for which the normal operation has been confirmed.

At the time of shipment, therefore, tests may be performed on only 100 GB of the total capacity of 1 TB of the storage area of the storage apparatus 10, for example. Accordingly, the time duration of the shipment test may be reduced to about one tenth of the time required for testing the whole storage area. In the initial stage of shipment, therefore, the normal operation has been confirmed for the entire valid storage area accessible by the information apparatus 20. Thus, the quality may be guaranteed as relatively high for at least 100 GB of the total capacity of 1 TB, for example.

Incidentally, the capacity of the valid storage area, i.e. the capacity of the storage area to which the use is limited by the storage area management unit 24 at the time of shipment corresponds to the storage capacity, which is considered sufficient for relatively problem-free operation of the system shipped as a product and with which the shipment test may be conducted in an acceptable time duration.

The HDD capacity extension unit 24b causes the command source 21 to issue a valid capacity control command to extend the valid usable area based on the extension definition file 27.

The extension area validation unit 24c executes the validation process, based on the extension definition file 27, so that the valid usable area extended by the HDD capacity extension unit 24b becomes actually usable by the information apparatus 20 (for example, the processing unit 22). For example, the extension area validation unit 24c extends the data base or the file system (not shown) of the OS 5 as a validation process, and causes the OS 5 to recognize the extended usable area as a valid usable area. Incidentally, in the case where the storage apparatus 10 is a RAID, the extension area validation unit 24c extends the logic volume as a validation process.

The HDD capacity extension unit 24b and the extension area validation unit 24c execute the process in accordance with the process executed by the used capacity confirmation unit 25 and the extension area test unit 26. This process is explained in detail later with reference to FIG. 4.

The used capacity confirmation unit 25 monitors the usage of the valid storage area in the disk unit 11. The ratio of the valid storage area used for data storage is confirmed by the used capacity confirmation unit 25 based on the extension definition files. For example, the capacity confirmation unit 25 may confirm the ratio of the valid storage area used for data storage at time intervals of 24 hours, which is indicated as a used capacity check rate in the extension definition file 27 of FIG. 3. For example, the used capacity confirmation unit 25 checks the used capacity by causing the command source 21 to issue a command to the storage apparatus 10 or confirms the usage by reading the usage data of the storage apparatus 10 held in the OS 5.

The extension area test unit 26 conducts the operation confirmation test on a storage area other than the valid storage area, e.g., the storage area where the operation confirmation test is not conducted in the disk unit 11 of the storage apparatus 10, for example.

Specifically, a read test having the specifics thereof included in the extension definition file 27 may be conducted in the background by the extension area test unit 26 on the storage area extended by the HDD capacity extension unit 24b.

The read test is conducted to check an operation of reading the data recorded in the storage apparatus 10. For example, the extension area test unit 26 causes the command source 21 to issue a read command to the storage area extended by the HDD capacity extension unit 24b and thus confirms whether the data recorded in the particular storage area of the storage apparatus 10 may be normally read into the information apparatus 20. In this manner, the extension area test unit 26 verifies the normalcy of the particular storage area as a recording medium of the disk unit 11 and the read mechanism of the storage apparatus 10.

Incidentally, in addition to the read test, the extension area test unit 26 may conduct a verification test, a write test and/or a write/read/compare test. In other words, a test may be conducted in accordance with the test specifics of the verification test, the write test and/or the write/read/compare test. As noted above test specifics may be included in the extension definition file 27.

The verification test checks the function of reading the data recorded in the storage apparatus 10. For example, the extension area test unit 26 causes the command source 21 to issue a verification command to the storage area extended by the HDD capacity extension unit 24b to confirm whether the data recorded in the particular storage area of the storage apparatus 10 may be read normally into the information apparatus 20.

Incidentally, data that have been read may not be transferred to the information apparatus 20. For example, only a result of the read process may be provided to the extension area test unit 26 of the information apparatus 20. In other words, if the verification test is to be conducted, the storage apparatus 10 is required to meet the conditions for the verification test.

Through a verification test such as the one described above, for example, the extension area test unit 26 verifies the normalcy of a particular storage area as a recording medium of the disk unit 11 and the read mechanism of the storage apparatus 10.

The write test, on the other hand, may be conducted to check a write function to record the data into the storage apparatus 10. For example, the extension area test unit 26 causes the command source 21 to issue a write command to the storage area extended by the HDD capacity extension unit 24b to confirm whether the test data held in the information apparatus 20 may be normally written into the particular storage area of the storage apparatus 10. In this manner, the extension area test unit 26 verifies the normalcy of the particular storage area as a recording medium of the disk unit 11 and the write mechanism of the storage apparatus 10.

Further, the write/read/compare test may be conducted to check the read operation and the write operation for the data in the storage apparatus 10. For example, the extension area test unit 26 first causes the command source 21 to issue a write command to the storage area extended by the HDD capacity extension unit 24b thereby to confirm whether the test data held in the information apparatus 20 may be normally written in the particular storage area of the storage apparatus 10. Then, the extension area test unit 26 causes the command source 21 to issue a read command to the particular storage area of the storage apparatus 10 to confirm whether the data recorded in the particular storage area may be normally read into the information apparatus 20. Further, the extension area test unit 26 compares the read data with the written data to verify the normalcy of the particular storage area as a recording medium and the data recording operation of the storage apparatus 10.

The extension area test unit 26 may conduct the above noted tests, e.g., the read test, for example, as a background operation.

A background operation refers to a method of conducting the operation confirmation test (hereinafter sometimes referred to simply as the confirmation test) during the operation of the information apparatus 20. Since the information apparatus 20 is in operation, the extension area test unit 26 conducts the confirmation test by a method, which takes into consideration the load of the information apparatus 20 and/or storage apparatus 10.

The extension area test unit 26 may conduct an operation confirmation test according to one or more of the methods (1) to (3) described below, for example. Further, the extension area test unit 26 may conduct the test using one or more of the methods (1) to (3) described below as a background operation (1) The extension area test unit 26 repeats a short-time test at regular time intervals. For example, the extension area test unit 26 conducts a one-minute test at one hour intervals. Incidentally, in the case where the operation of the information processing system 1 is stopped before completion of the confirmation test, the extension area test unit 26 conducts a continued version of the test in the next session of system operation.

(2) The extension area test unit 26 conducts the confirmation test in the case where the operation of the information processing system 1 enters an idle mode or a similar mode. In this case, the extension area test unit 26 monitors the operating condition of the system, and conducts the confirmation test upon detection of the situation in which no application is operating or substantially no application is operation. In this case, the working factor of the CPU 2 may be reduced below a level or the frequency of access to the storage apparatus 10 may be reduced below a level. The extension area test unit 26 may monitor the system operation even during the test, and if a situation change making it difficult to meet the test conditions, the test may be suspended.

(3) The extension area test unit 26 conducts the test under a light load in parallel to the system operation of the information processing system 1. For example, the extension area test unit 26 continuously conducts the test by frequently granting the right to use the CPU 2 openly, reducing each unit of access to the storage apparatus 10 or setting the access interval at a specified time or longer.

Incidentally, the extension area test unit 26 may conduct the test using one or more of the methods (1) to (3) noted above as a background operation. Further, the extension area test unit 26 may conduct the operation confirmation test at the time of system start or system stop in addition to or instead of as a background operation. It is also noted that the extension definition file 27 may provide or be used in test conduction methods executed at the time of system start, system stop or by self diagnosis.

In a method including conducting the test at the time of system start, the confirmation test on the storage area extended by the HDD capacity extension unit 24b is conducted by the extension area test unit 26 at the time of starting the information apparatus 20. In this case, the extension area test unit 26 may conduct the test at the time of activating the information apparatus 20 before starting the operation of the information processing system 1, for example. This method may complete the test within a relatively short time period without regard to the load on the system. In the case where the extended storage area is so large that a considerable amount of time is required for the test, however, the extension area test unit 26 may conduct and complete the test by starting the system in plural divisions.

In the method including conducting the test at the time of system stop, on the other hand, the storage area extended by the HDD capacity extension unit 24b is tested at the time of stopping the information apparatus 20. In this case, the extension area test unit 26 may conduct the test while the information apparatus 20 is not in operation after stopping the information processing system 1, for example. This method may also complete the test within a relatively short time period without regard to the load on the system operation. In the case where the extended storage area is so large that a considerable time is required for the test, however, the extension area test unit 26 may complete the test in divisions by starting the system at plural different times.

Further, according to the test method including self-diagnosis, the storage area extended by the HDD capacity extension unit 24b is conducted by the extension area test unit 26 using a self-diagnosis operation of the storage apparatus 10. For example, an ATA interface HDD may provide the function of conducting the read test by self-diagnosis on an arbitrary recording medium in accordance with the command from the host computer such as the Selective_Self-Test command of the SMART function defined in the ATA standard, for example. In the case where the storage apparatus 10 is such a HDD, therefore, the extension area test unit 26 of the information apparatus 20, as a host computer, may cause the command source 21 to issue the Selective_Self-Test command to conduct the test on the storage area by activating the self-diagnosis function of the storage apparatus 10 during the system operation.

In the test by the extension area test unit 26, the control unit 12 of the storage apparatus 10 that has received a command from the command source 21 conducts the test based on the particular command. More specifically, the read/write control unit 13 conducts the test. The control unit 12 first manages the test result, e.g., a result indicating whether a read operation or the write operation is executed normally.

The control unit 12 may store the test result in a memory (not shown). Further, in the case where the read operation or the write operation ends in an error, the control unit 12, in accordance with the response from the disk unit 11, holds by detecting whether the particular error is caused by a defect of the recording medium of the disk 11, the head positioning mechanism of the disk drive, or another mechanical defect, for example. The test results may be transmitted to the extension area test unit 26 of the information apparatus 20 from the storage apparatus 10 through the interface 4, for example.

Also, even in the case where a situation develops in which the data cannot be written or read due to a malfunction of the recording medium system during the test, the read/write control unit 13 of the storage unit 10 continues the test from the next block without stop by skipping the block of the erroneous recording area. Thus, the test is completed on the recording area (in this case, the storage area for 100 GB) extended at the request of the HDD capacity extension unit 24b.

Incidentally, the read/write control unit 13 may conducts the test in blocks. The blocks may each have a capacity of 512 bytes, for example.

The control unit 12 judges whether the number of the blocks where an error has developed is less than a specified value (which is about 10, for example), and in the case where the number of blocks is less that the specified value, the test is considered to be completed normally. In other words, for example, as long as the storage capacity confirmed as defective is not more than 5.12 KB, the test may be regarded as having been normally completed.

The usable area management unit 14 of the control unit 12 regards an erroneous block as a restricted area and prohibits future use of the erroneous block.

As described above, in the case where the capacity of the storage area in which a defect has been confirmed is not more than a specified value, the usable area management unit 14 operates as a restricted area management unit to manage the defective storage area as a restricted area.

In the case where a write request is issued from the information apparatus 20 to the block that has developed a medium error, for example, the control unit 12 replaces the block having the medium error with another block that the storage apparatus 10 may access from the information apparatus 20.

In the case where more blocks than a specified number develop an error, on the other hand, the control unit 12 judges that the function of the HDD is destroyed and thus, the test is ended in error and the occurrence of the medium error is reported to the notification unit 28 or the extension area test unit 26 of the information apparatus 20. The notification unit 28, upon receipt of the notification from the storage apparatus 10 or the extension area test unit 26 that the a medium error of the disk unit 11 is found by the operation confirmation test, notifies a user to replace the disk unit 11 or the storage apparatus 10. This notification may be provided using the display unit 8 or the speaker 9, for example, connected to the information apparatus 20.

In the case where the capacity of the storage area of which a defect is confirmed by the extension area test unit 26 is larger than a specified value, the notification unit 28 notifies external devices of the defect of the storage apparatus 10.

Also, upon detection of a mechanical defect such as the malfunction of the head positioning mechanism of the disk drive of the disk unit 11, for example, the control unit 12 judges that the function of HDD is destroyed and ends the test as an error. Then, the extension area test unit 26 or the notification unit 28 of the information apparatus 20 is notified that an error has developed in the storage apparatus 10. In this case, the notification unit 28 also notifies external devices that the storage apparatus 10 is defective.

Figure 4:
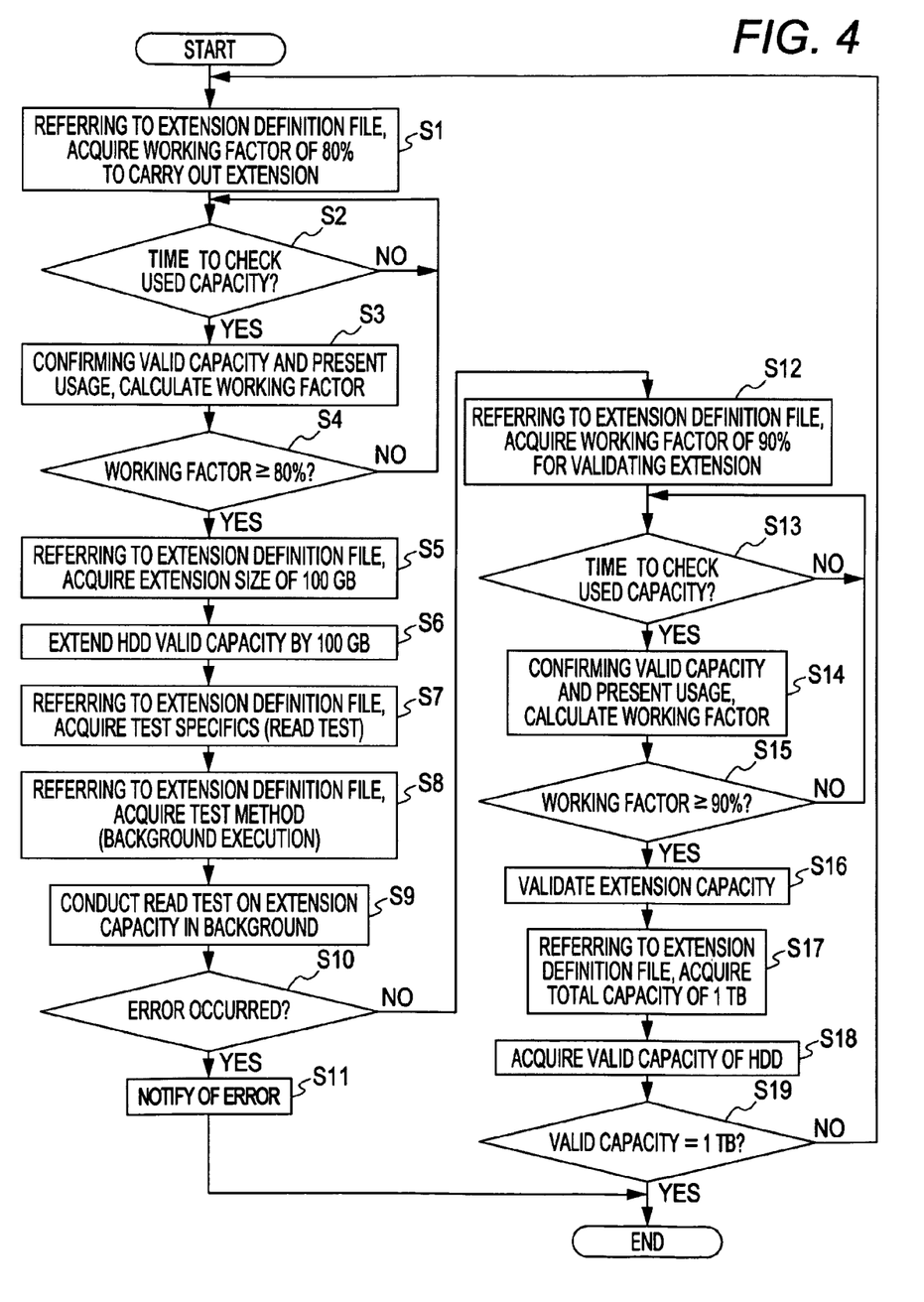
FIG. 4 is a flowchart for explaining a storage area management method according to an example of an embodiment of the present invention.

Next, with reference to the flowchart (steps S1 to S19) of FIG. 4, a storage area management method is explained. The example shown in FIG. 4 represents a case in which the process is started from a state in which the shipment capacity setting unit 24a of the storage area management unit 24 of the information apparatus 20 limits the capacity of the valid usable area to 100 GB based on the extension definition file 27, e.g., a case in which only the shipment capacity 11a of FIG. 1 is limited as a valid usable area.

The HDD capacity extension unit 24b of the storage area management unit 24 refers to the extension definition file 27 and acquires the working factor at which the extension of the storage area is started, e.g., 80% in this example (S1).

Then, the used capacity confirmation unit 25 judges whether the timing is appropriate for checking the used capacity of the valid usable area in the storage apparatus 10. The check interval may be every 24 hours, for example, according to the extension definition file 27 in the storage apparatus 10 (S2).

If the time is not appropriate (NO in S2), the used capacity confirmation unit 25, etc. enters the standby mode without executing an operation as shown in FIG. 4. If the time indicates the used capacity should be checked (YES in S2), the used capacity confirmation unit 25 confirms the working factor of the valid usable area (S3).

Incidentally, the used capacity confirmation unit 25, in the first session of usage confirmation, always judges that the check should be performed, whereas in the next and subsequent sessions, the judgement is based on whether 24 hours has passed from the first confirmation session or previous confirmation session.

Still referring to FIG. 4, the used capacity confirmation unit 25 confirms the present valid capacity of the valid usable area (100 GB at the time of shipment) and the present usage of the valid usable area. Based on the present capacity and present usage, the used capacity confirmation unit 25 calculates the working factor of the valid usable area (S3).

Next, the HDD capacity extension unit 24b of the storage area management unit 24 judges that the working factor confirmed by the used capacity confirmation unit 25 is more than the working factor of 80% or not (S4).

If the HDD capacity extension unit 24b determines that the working factor, in terms of usage, is less than 80% (NO in S4), the process returns to S2 as depicted in FIG. 4. If the HDD capacity extension unit 24b determines the working factor, in terms of usage, is more than 80%, on the other hand, the HDD capacity extension unit 24b refers to the extension definition file 27 and acquires the extension capacity unit of 100 GB (S5). In other words, the HDD capacity extension unit 24b determines the capacity to be extended based on the extension definition file 27.

Next, the HDD capacity extension unit 24b executes the process of extending the valid capacity by 100 GB (S6). For example, the HDD capacity extension unit 24b causes the command source 21 to issue the valid capacity control command for extending the storage area by 100 GB to the storage apparatus 10. The usable area management unit 14 of the control unit 12 of the storage apparatus 10, upon receipt of the valid capacity control command from the information apparatus 20, extends the storage area (described as "the first extension area" in FIG. 1) 11b by 100 GB.

Then, the extension area test unit 26, by referring to the extension definition file 27, acquires the specifics of the operation confirmation test on the extended storage area 11b (S7). In this example, the extension area test unit 26 acquires the read test as the specific test.

Further, the extension area test unit 26, referring to the extension definition file 27, acquires the test method (S8). In this example, the extension area test unit 26 acquires the background execution as a test method.

The extension area test unit 26 conducts the read test for the extended area 11b as a background operation (S9). For example, the extension area test unit 26 conducts the read test by causing the command source 21 to issue a read command to the storage apparatus 10. As described above, the extension area test unit 26 conducts the operation confirmation test in accordance with the present usage of the valid storage area.

If the result of the test conducted by the extension area test unit 26 is confirmation of a medium error or a hard error in the storage apparatus 10 (YES in S10), the notification unit 28 notifies users through the display unit 8 or the speaker 9, for example, that an error is confirmed and that the storage apparatus 10 should be replaced (S11). If a medium error or a hard error in the storage apparatus is found and the user is notified, the method depicted in FIG. 4 ends.

Alternatively, if result of the test conducted by the extension area test unit 26 is that there is no error, normal operation of the extended area 11b is confirmed (NO in S10), and the extension area validation unit 24c refers to the extension definition file 27 and acquires the working factor of 90% for validation of the extended area 11b (S12).

Incidentally, as described above, the extension area test unit 26 may indicate that no error has occurred (NO in S10) if the capacity of the defective storage area is less than a specified value, e.g., the number of error blocks is less than 10, for example. If there are fewer error blocks than 10 for example, the usable area management unit 14 manages the error blocks as a restricted area.

The used capacity confirmation unit 25 (like in S2) judges whether the timing is appropriate for checking the used capacity of the valid usable area in the storage apparatus 10 (S13).

If the timing is not appropriate (e.g., 24 hours has not elapsed since the previous check) (NO in S13), the used capacity confirmation unit 25 does not check the used capacity of the valid usable area of the storage apparatus 10. Alternatively, if the timing is appropriate (e.g., 24 hours has elapsed since the previous check) (YES in S13), the used capacity confirmation unit 25 confirms the working factor of the valid usable area (S14).

The used capacity confirmation unit 25 confirms the current valid capacity of the valid usable area and the current usage of the valid usable area if the timing is appropriate. Based on the present valid capacity of the valid usable area and the present usage of the valid usable area, the used capacity confirmation unit 24 calculates the working factor of the valid usable area (S14).

Then, the extension area validation unit 24c determines whether the working factor confirmed by the used capacity confirmation unit 25 is more than 90% since working factor for validation is identified as 90% in the extension definition file 27 (S15).

If the extension area validation unit 24c determines the working factor in terms of usage is less than 90% (NO in S15), the method depicted in FIG. 4 returns to S13. If the extension area validation unit 24c determines the working factor in terms of the usage is more than 90%, on the other hand, the extension area validation unit 24c changes the extension of the file system of the OS 5, for example, and validates the extension area 11b for which the normal operation has been confirmed by the extension area test unit 26 (S16).

As described above, the extension area validation unit 24c validates by extending the valid storage area in accordance with the present usage of the valid storage area.

Next, the HDD capacity extension unit 24b of the storage area management unit 24, for example, refers to the extension definition file 27 and acquires the total capacity of the storage apparatus 10 (S17). For example, the total capacity of the storage apparatus 10 is identified as 1 TB in the example extension definition file 27 of FIG. 3. The HDD capacity extension unit 24b also acquires the present valid capacity of the valid usable area of the storage apparatus 10 (S18). It is noted that the HDD capacity extension unit 24b may acquire the total capacity of the storage apparatus 10 and the present valid capacity of the valid usable area at the same time.

The HDD capacity extension unit 24b determines whether the present valid capacity equals to the total valid capacity of 1 TB or not (S19). For example, the HDD capacity extension unit 24b judges whether the entire storage area of the storage apparatus 10 has been validated and extended as a valid storage area or not.

Unless the valid capacity has reached 1 TB (NO in S19), the method depicted in FIG. 4 returns to S2, and executes another storage area extension process, e.g., executes another process for validating the extension area 11c shown in FIG. 1. Subsequently, the extension process (validation process) is continued until it is determined that the unused area 11d has disappeared and the validation capacity has reached 1 TB (YES in S19). The HDD valid capacity control unit 23 continues to extend the valid usable area stepwise from the limited state at the time of shipment until the entire storage area of the disk unit 11 of the storage apparatus 10 has been extended for the valid usable area (YES in S19).

As described above, in the information processing system 1 according to an example of an embodiment of the present invention, the storage area management unit 24 limits the valid storage area to a part of the entire storage area of the storage apparatus 10, and from this limited state, extends stepwise, as a valid storage area, the storage area for which the normal operation is confirmed by the extension area test unit 26. In the initial stage or at the time of product shipment of the storage apparatus 10, therefore, the operation confirmation test to secure the quality is conducted on only a part of the storage area limited by the storage area management unit 24. Thus, the time duration of the test may be remarkably reduced, thereby contributing to the reduction in the personnel expense and the equipment cost for conducting the test.

Further, from the very beginning of shipment of the storage apparatus 10, the entire valid storage area accessible by the information apparatus 20 may be regarded as having been subjected to the shipment test. Thus, a user may positively use the storage area, which has been tested and determined to be of high quality.

Furthermore, the storage area for which the normal operation is confirmed by the extension area test unit 26 is extended stepwise by the storage area management unit 24. Therefore, the user of the storage apparatus 10 is using the storage area for which the normal operation has been confirmed by the operation confirmation test, and therefore, the storage area being used has been determined to be of high quality. Finally, the entire storage area of the storage apparatus 10 is tested for normal operation at an appropriate timing. In other words, the user may avoid using a storage area for which a long time has passed since the storage area has been used for normal operations. A storage area that has not been used for normal operation for a long time may be more likely to develop a malfunction.

Also, the HDD capacity extension unit 24b and the extension area validation unit 24c of the storage area management unit 24 extend the valid storage area in accordance with the working factor in terms of the usage monitored by the used capacity confirmation unit 25. Therefore, the lead time between the quality test and the actual use of the valid storage area is shortened. For example, the HDD capacity extension unit 24b extends the usable area of the storage apparatus 10 in accordance with the working factor thereof and the extension area test unit 26 conducts the operation confirmation test on the extended area. As a result, the lead time from the operation confirmation test conducted to ensure the quality to the extension of the particular storage area as a valid storage area may be shortened, which may provide better results regarding quality.

In the case where a long time passes from a test to the actual use of the storage area as in the related art, an error is liable to occur due to the secular change at the time of actual use thereof. In the information processing system 1 according to an example of an embodiment of the present invention, however, the likelihood of secular change is very low.

Further, the HDD capacity extension unit 24b extends the usable area of the storage apparatus 10 and the extension area test unit 26 conducts the operation confirmation test on the extended area when the working factor in terms of usage reaches 80%. In this way, the operation confirmation test is conducted by the extension area test unit 26 when the working factor reaches 80%. Further, subsequently when the operation confirmation test by the extension area test unit 26 is completed and the working factor increases to 90% or more higher than the working factor with which to start the operation confirmation test, the extension area validation unit 24c validates the particular extended area thereby to extend the valid storage area of the information apparatus 20.

Also, in the case where an anomaly or defect is confirmed by the extension area test unit 26 and the capacity of the storage area of which the anomaly is confirmed is not more than a specified value, then the storage area of which the anomaly is confirmed is managed as a restricted area by the usable area management unit 14. As a result, the replacement of the disk unit 11 upon occurrence of a minor error is reduced.

In the case where the capacity of the storage area of which the anomaly is confirmed by the extension area test unit 26 is more than a specified value, on the other hand, the notification unit notifies that the storage apparatus 10 is defective. The user of the information processing system 1 is then informed of the defective state of the storage apparatus 10, and the storage apparatus 10 may be repaired by changing the recording medium or the like before the actual use of the defective recording medium.

Incidentally, this invention is not limited to the embodiments described above and can be variously modified without departing from the spirit and scope of the invention.

The examples of embodiments described above, for example, represent a case in which the information apparatus 20 has the extension definition file 27 based on which the various processes are executed. Nevertheless, the invention is not limited to this configuration and the various definition data may be freely set or changed by the user of the information processing system 1.

Also, in the examples of the embodiments described above, the timing of extending the valid storage area of the information apparatus 20 is determined in accordance with the present usage of the valid storage area. Nevertheless, the invention is not limited to such a case, and the storage area management unit 24 may be configured to extend the valid storage area at specified time intervals.

Further, the storage area management unit 24 may execute the process of extending the valid storage area taking the usage rate into consideration as well as the working factor in terms of the present usage of the valid storage area. Specifically, the used capacity confirmation unit 25 calculates the working factor while at the same time calculating the rate at which the used capacity increases, based on the increase in the used capacity from the previously checked used capacity and the check time interval. Then, in the case where the rate of increase of the used capacity is not less than a specified value, the storage area management unit 24 may be configured to execute the process of extending the valid storage area. Even in the case where the storage area is used at a rapidly increased rate, therefore, the shortage of the valid storage area may reduced and/or avoided, and satisfactory system operation realized.

Incidentally, the specified value of the increase rate may be desirably changed in accordance with the prevailing working factor to assure the aforementioned advantages.

Further, in the case where the increase rate calculated by the used capacity confirmation unit 25 is more than the specified, the storage area management unit 24 may correspondingly increase the capacity of the valid storage area extended. For example, in the case where the increase rate is more than the specified value, the storage area management unit 24 may set the extension capacity unit not at 100 GB, for example, but at 200 GB, for example. As a result, the extension process may be executed more appropriately in accordance with the usage of the information apparatus 20 and the shortage of the valid storage area may be suppressed.

Also, the functions of the HDD valid capacity control unit 23 including the storage area management unit 24 (the shipment capacity setting unit 24a, the HDD capacity extension unit 24b and the extension area validation unit 24c), the used capacity confirmation unit 25, the extension area test unit 26, the notification unit 28 and the control unit 12 (the read/write control unit 13 and the usable area management unit 14) may be implemented by a computer (including the CPU, the information apparatus and various terminals) executing a program.

Such a program is recorded in a computer-readable recording medium such as the flexible disk, CD (CD-RM, CD-R, CD-RW, etc.) or DVD (DVD-ROM, DVD-RAM, DVD-R, DVD-RW, DVD+R, DVD+RW, etc.). In this case, the computer reads the storage area management program from the recording medium and stores by transferring it to an internal or an external storage apparatus. Also, the program may be recorded in, for example, the magnetic disk, optical disk, magnetooptic disk or the like storage apparatus (recording medium) and supplied from the storage apparatus to the computer through a communication line.

The computer is a concept including the hardware and the OS (operating system), and indicates the hardware operated under the control of the OS. Also, in the case where the OS is not required and the hardware is operated only with an application program, the particular hardware corresponds to the computer. The hardware includes at least a microprocessor such as a CPU and a means for reading the computer program recorded in a recording medium.

The application program constituting the storage area management program described above includes a program code for the computer to realize the functions of the storage area management unit 24 (the shipment capacity setting unit 24a, the HDD capacity extension unit 24b and the extension area validation unit 24c), the used capacity confirmation unit 25, the extension area test unit 26, the notification unit 28 and the control unit 12 (the read/write control unit 13 and the usable area management unit 14). Also, a part of these functions may be implemented by the OS but not by the application program.

Incidentally, the recording medium according to this embodiment may include any of the various computer-readable media, as described above, such as the flexible disk, CD, DVD, magnetic disk, optical disk, magnetooptic disk, IC card, ROM cartridge, magnetic tape, punch card, internal storage apparatus (memory such as RAM or ROM) and external storage apparatus of the computer or prints printed with the bar code or the like code.

As described above, with the aforementioned information apparatus or system and the storage area management method and program, the storage area management unit limits the accessible valid storage area to a part of the entire storage area of the storage apparatus, and from the limited state, the storage area for which the normal operation is confirmed by the operation confirmation test unit is extended stepwise as a valid storage area. In the initial stage or, for example, at the time of shipment of the storage apparatus as a product, therefore, the test to secure the quality is required to be conducted on the part of the storage area limited by the storage area management unit, thereby making it possible to shorten the test time considerably and thus contributing to lower personnel expenses and the equipment cost for the test.

In addition, from the very beginning of shipment of the storage apparatus, the entire valid storage area accessible by the information apparatus may be set as an area already subjected to the shipment test.

Further, in view of the fact that the storage area for which the normal operation is confirmed by the operation confirmation test unit is extended stepwise subsequently as a valid storage area by the storage area management unit, the user of the storage apparatus uses the storage area on which the operation confirmation test has been conducted and for which the normal operation has been confirmed shortly before the actual use. In this way, a tested, high quality storage area is used by the user, and the entire storage area of the storage apparatus can be finally used after confirming the normal operation thereof at appropriate timing. In other words, the user does not use a portion of the storage area for which the normal operation is not confirmed for a long time and which may cause a malfunction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the examples of embodiments of the present invention have been described in detail, it should be understood that the various changes, substitutions, and alterations could be made hereto without departing from the spirit and scope of the invention.

What is claimed is:

1. An information apparatus accessing a storage apparatus, the information apparatus comprising:
   a processor to execute a process including
      executing a test on a storage area of the storage apparatus to determine whether a command issued to the storage area of the storage apparatus results in a medium error or a hard error, and
      setting an accessible valid storage area in the storage area, and
      extending the accessible valid storage area to extend a valid capacity by including a part of the storage area for which the command issued to the storage area of the storage apparatus did not result in a medium error or a hard error.

2. The information apparatus according to claim 1, wherein the process further includes
   monitoring usage of the accessible valid storage area, wherein the processor extends the accessible valid storage area in accordance with the monitored usage.

3. The information apparatus according to claim 2, wherein the process includes executing the test in accordance with the usage.

4. The information apparatus according to claim 3, wherein when the usage reaches a first value, the processor executes the test, and when the test is completed and the usage reaches a second value larger than the first value, the processor extends the accessible valid storage area.

5. An information processing system comprising:
   a storage unit; and
   a processor to access the storage unit, wherein the processor executes a process including
      executing a test on the storage area of the storage unit to determine whether a command issued to the storage area of the storage unit results in a medium error or a hard error,
      setting an accessible valid storage area in the storage area, and
      extending the accessible valid storage to extend a valid capacity by including a part of the storage area for which the command issued to the storage area of the storage unit did not result in a medium error or a hard error.

6. The information processing system according to claim 5, wherein the process further includes
   monitoring usage of the valid accessible storage area of the storage unit, wherein the processor extends the accessible valid storage area in accordance with the monitored usage.

7. The information processing system according to claim 6, wherein the process includes executing the test in accordance with the usage.

8. The information processing system according to claim 7, wherein when the usage reaches a first value, the processor executes the test, and when the test is completed and the usage reaches a second value larger than the first value, the processor extends the accessible valid storage area.

9. The information processing system according to claim 5, wherein the process further includes
   managing, when a capacity of a defect area is less than a specified value, the defect area as a restricted area.

10. The information processing system according to claim 9, wherein the process further includes
    notifying, when a capacity of the defect area is more than the specified value, an external device of the defect of the storage unit.

11. A storage area management method for management of an accessible valid storage area of a storage unit, the method comprising:
    executing a test on a storage area of the storage unit to determine whether a command issued to the storage area of the storage unit results in a medium error or a hard error;
    setting the accessible valid storage area in the storage area; and
    extending the accessible valid storage area to extend a valid capacity by including a part of the storage area for which the command issued to the storage area of the storage unit did not result in a medium error or a hard error.

12. The storage area management method according to claim 11, further comprising:
    monitoring usage of the accessible valid storage area, wherein the extending the accessible valid storage area is based on the monitored usage.

13. The storage area management method according to claim 12, wherein the test is executed in accordance with the usage.

14. The storage area management method according to claim 13, wherein when the usage reaches a first value, the test is executed, and when the test is completed and the usage reaches a second value larger than the first value, the accessible valid storage area is extended.

15. The storage area management method according to claim 11, further comprising:
    managing, when a capacity of a defect area is less than a specified value, the defect area confirmed by the test as a restricted area.

16. The storage area management method according to claim 15, further comprising:
    notifying an external device of a defect of the storage unit when a capacity of the defect area is more than the specified value.

17. A computer-readable recording medium encoded with a computer program that causes a computer accessing a storage unit to perform a method for storage area management of a valid storage area of the storage unit, the method comprising:
    executing a test on the storage area of the storage unit to determine whether a command issued to the storage area of the storage unit results in a medium error or a hard error;
    setting the accessible valid storage area in the storage area; and
    extending the accessible valid storage area to extend a valid capacity by including a part of the storage area for which the command issued to the storage area of the storage unit did not result in a medium error or a hard error.

18. The computer-readable recording medium according to claim 17, the method further comprising:
    monitoring usage of the accessible valid storage area, wherein the extending the accessible valid storage area in based on the monitored usage.

19. The computer-readable recording medium according to claim 18, wherein the test is executed in accordance with the usage.

20. The computer-readable recording medium according to claim 19, wherein when the usage reaches a first value, the test is executed, and when the test is completed and the usage reaches a second value larger than the first value, the accessible valid storage area is extended.

* * * * *